United States Patent
Yasuda et al.

(10) Patent No.: US 11,749,032 B2
(45) Date of Patent: Sep. 5, 2023

(54) SYSTEMS AND METHODS FOR ADAPTING NOTIFICATIONS ACCORDING TO COMPONENT MONITORING

(71) Applicant: Toyota Research Institute, Inc., Los Altos, CA (US)

(72) Inventors: Hiroshi Yasuda, San Francisco, CA (US); Manuel Ludwig Kuehner, Mountain View, CA (US)

(73) Assignee: Toyota Research Institute, Inc., Los Altos, CA (US)

( * ) Notice: Subject to any disclaimer, the term of this patent is extended or adjusted under 35 U.S.C. 154(b) by 144 days.

(21) Appl. No.: 17/321,939

(22) Filed: May 17, 2021

(65) Prior Publication Data

US 2022/0366737 A1 Nov. 17, 2022

(51) Int. Cl.
| | |
|---|---|
| *G07C 5/08* | (2006.01) |
| *B60Q 9/00* | (2006.01) |
| *G08B 5/36* | (2006.01) |
| *G06V 20/59* | (2022.01) |
| *G06V 40/19* | (2022.01) |
| *G08B 21/24* | (2006.01) |
| *G08B 21/06* | (2006.01) |

(52) U.S. Cl.
CPC ............. *G07C 5/0825* (2013.01); *B60Q 9/00* (2013.01); *G06V 20/597* (2022.01); *G06V 40/19* (2022.01); *G08B 5/36* (2013.01); *G08B 21/24* (2013.01); *G08B 21/06* (2013.01)

(58) Field of Classification Search
CPC .... G07C 5/0825; B60Q 9/00; G06K 9/00604; G06K 9/00845; G08B 5/36; G08B 21/24; G08B 21/06; G06V 20/597; G06V 40/19; G06V 10/143; G06V 40/193; B60W 2050/0088; B60W 2050/146; B60W 50/14; B60W 2540/225; B60W 2540/229
See application file for complete search history.

(56) References Cited

U.S. PATENT DOCUMENTS

| | | | |
|---|---|---|---|
| 6,397,137 B1 | 5/2002 | Alpert et al. | |
| 8,344,894 B2 | 1/2013 | Szczerba et al. | |
| 9,650,041 B2 | 5/2017 | Feit et al. | |
| 10,688,912 B2 | 6/2020 | Kurashige | |
| 2009/0022368 A1 | 1/2009 | Matsuoka et al. | |
| 2016/0133117 A1 | 5/2016 | Geller et al. | |
| 2017/0364760 A1* | 12/2017 | Canella | G06V 40/19 |

(Continued)

FOREIGN PATENT DOCUMENTS

| | | |
|---|---|---|
| EP | 2715486 A2 | 4/2014 |
| KR | 102168041 B1 | 10/2020 |
| WO | 2018227597 A1 | 12/2018 |

*Primary Examiner* — Brian Wilson
(74) *Attorney, Agent, or Firm* — Christopher G. Darrow; Darrow Mustafa PC

(57) ABSTRACT

System, methods, and other embodiments described herein relate to adapting notifications according to monitoring states of a vehicle operator. In one embodiment, a method includes acquiring sensor data associated with an operator of a vehicle. The method also includes determining an operator state from the sensor data. The method also includes computing a difference of the operator state to a parameter associated with monitoring a component in the vehicle. The method also includes adapting a notification associated with the component by a controller according to the difference.

20 Claims, 5 Drawing Sheets

(56) References Cited

U.S. PATENT DOCUMENTS

| | | |
|---|---|---|
| 2018/0046869 A1* | 2/2018 | Cordell .................. G08B 21/06 |
| 2020/0320880 A1 | 10/2020 | Ko |
| 2020/0339131 A1* | 10/2020 | Olsson .............. B60W 50/0205 |
| 2020/0377107 A1 | 12/2020 | Fung et al. |
| 2021/0053579 A1 | 2/2021 | Gaudin et al. |
| 2021/0061287 A1 | 3/2021 | Cieslar |

* cited by examiner

SYSTEMS AND METHODS FOR ADAPTING NOTIFICATIONS ACCORDING TO COMPONENT MONITORING

TECHNICAL FIELD

The subject matter described herein relates, in general, to notifications in a vehicle, and, more particularly, to adapting notifications for monitoring components in the vehicle.

BACKGROUND

Systems in a vehicle may use notifications for safety, entertainment, and driving. Notifications may allow a vehicle to bring operator awareness towards components of the vehicle or driving scenarios. Lack of sufficient awareness is present during distracted driving or when operating newer features in a vehicle. Regarding automated driving, an automated vehicle may benefit from operator awareness for certain tasks, such as checking mirrors or activating turn signals during automated mode and particularly for tasks after takeover in manual mode. Also, operators accustomed to automated driving may lack skills for assisted driving and related emergencies. Unlike manual mode, assisted driving may involve partial operation by the operator monitoring the vehicle during automation. Similarly, operators that drive infrequently for either manual or automated modes may lack experience for proficient and safe driving.

SUMMARY

In one embodiment, example systems and methods relate to adapting notifications using monitoring states of an operator. In various implementations, operators may inadequately monitor vehicle components or driving environments for various scenarios. Furthermore, operators accustomed to automated driving may lack skills for proficient driving and responding to emergencies. For instance, soon some operators may lack training in the manual operation of a vehicle due to regions without vehicles operating in manual mode. Accordingly, systems in a vehicle may encounter difficulties at engaging an operator for safe and proficient operation. Therefore, in one embodiment, a notification system may adapt the operation of a component according to a parameter for monitoring driving states facilitated by sensor data. For example, the parameter may represent a minimum number of times the operator should monitor a mirror (i.e., the component) during highway driving. In addition, the notification system may use the sensor data (e.g. camera data) to determine an operator state during driving.

The operator state, in various implementations, may represent the time looking away from the component or mirror in the vehicle. Accordingly, the notification system may illuminate the component to a level that draws operator awareness. For example, different colors of light may represent urgency levels. In one approach, a controller may change the urgency level of the component by comparing a gaze frequency of the operator state to the parameter. In this way, the notification system may adapt component monitoring by the operator using notifications and operator states to improve driver proficiency and safety.

In one embodiment, a notification system for adapting notifications according to monitoring states of a vehicle operator is disclosed. The notification system includes a processor and a memory communicably coupled to the processor. The memory stores a notification module including instructions that when executed by the processor cause the processor to acquire sensor data associated with an operator of a vehicle. The instructions also include instructions to determine an operator state from the sensor data. The instructions also include instructions to compute a difference of the operator state to a parameter associated with monitoring a component in the vehicle. The instructions also include instructions to adapt a notification associated with the component by a controller according to the difference.

In one embodiment, a non-transitory computer-readable medium for adapting notifications according to monitoring states of a vehicle operator and including instructions that when executed by a processor cause the processor to perform one or more functions is disclosed. The instructions include instructions to acquire sensor data associated with an operator of a vehicle. The instructions also include instructions to determine an operator state from the sensor data. The instructions also include instructions to compute a difference of the operator state to a parameter associated with monitoring a component in the vehicle. The instructions also include instructions to adapt a notification associated with the component by a controller according to the difference.

In one embodiment, a method for adapting notifications according to monitoring states of a vehicle operator is disclosed. In one embodiment, the method includes acquiring sensor data associated with an operator of a vehicle. The method also includes determining an operator state from the sensor data. The method also includes computing a difference of the operator state to a parameter associated with monitoring a component in the vehicle. The method also includes adapting a notification associated with the component by a controller according to the difference.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Systems, methods, and other embodiments associated with adapting notifications according to monitoring states of a vehicle operator are disclosed herein. A notification system in a vehicle may acquire sensor data to determine an operator state. In one approach, the sensor data may be images that the notification system uses to geometrically estimate a gaze or head position of the operator towards a component. As such, the notification system may use the gaze to determine the operator state, such as time looking away from a mirror, time observing the instrument panel, time observing the front windshield, and so on.

In various implementations, the notification system may also use a parameter for monitoring the component such as a frequency of monitoring a side-view mirror during a lane change or a control that is set using safety standards, manufacturer criteria, original equipment manufacturer (OEM) guidelines, and so on. The notification system may then compare the operator state to the parameter and adapt an indicator of the component accordingly.

Moreover, the indicator may be a light-emitting diode (LED), an audible device, and so on of the component that attracts operator attention. For the illumination of the component, the light may be color-coded corresponding to urgency levels for bringing operator awareness and attention to the component. As such, the notification system may use these color-codes according to the sensor data and adaptively guide the operator. In one approach, the color-codes may reflect a summary or moving average of a cost function associated with the operator state that improves gaze estimates or measurements. In this way, the notification system may train or guide an operator through visual or auditory notifications for a component, thereby improving driver proficiency and safety for the driving state.

Figure 1:
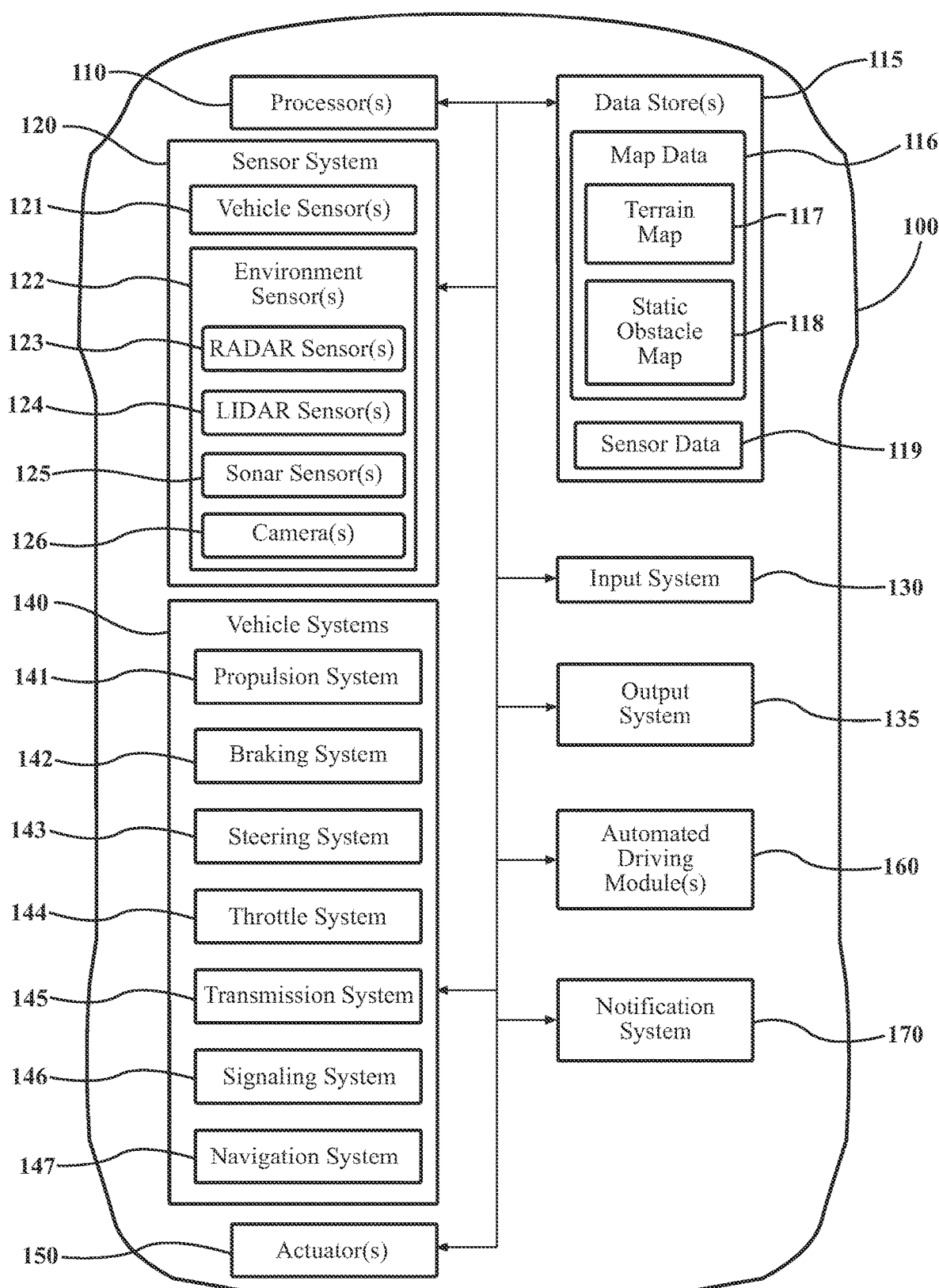
FIG. 1 illustrates one embodiment of a vehicle within which systems and methods disclosed herein may be implemented.

Referring now to FIG. 1, an example of a vehicle 100 is illustrated. As used herein, a "vehicle" is any form of motorized transport. In one or more implementations, the vehicle 100 is an automobile. While arrangements will be described herein with respect to automobiles, it will be understood that embodiments are not limited to automobiles. In some implementations, the vehicle 100 may be any robotic device or form of motorized transport that, for example, includes sensors to perceive aspects of the surrounding environment, and thus benefits from the functionality discussed herein for adapting notifications according to monitoring states associated with a vehicle operator.

The vehicle 100 also includes various elements. It will be understood that in various embodiments, the vehicle 100 may have less than the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances.

Some of the possible elements of the vehicle 100 are shown in FIG. 1 and will be described along with subsequent figures. However, a description of many of the elements in FIG. 1 will be provided after the discussion of FIGS. 2-4 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements. In either case, the vehicle 100 includes a notification system 170 that is implemented to perform methods and other functions as disclosed herein relating to adapting notifications according to monitoring states associated with a vehicle operator.

Figure 2:
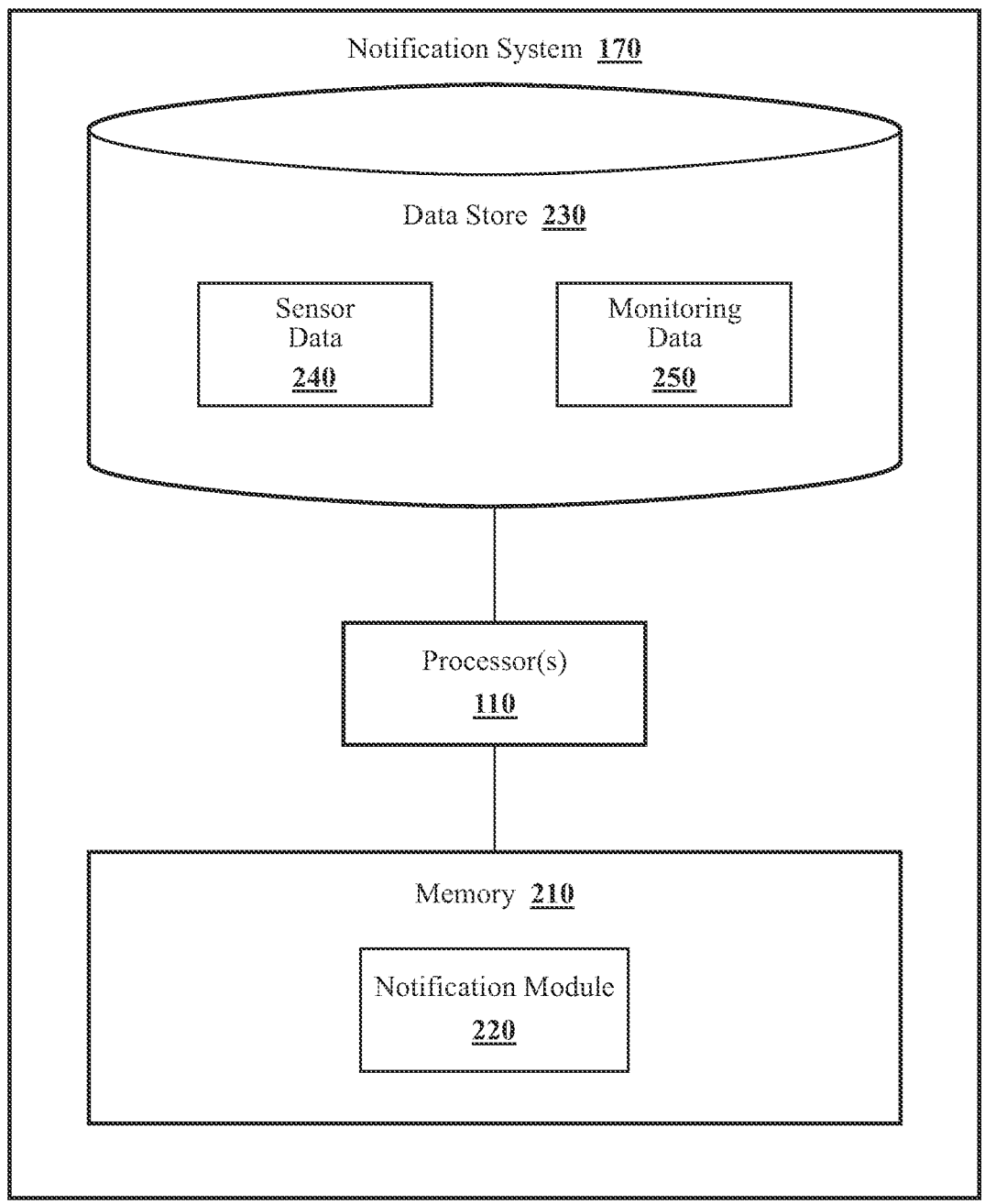
FIG. 2 illustrates one embodiment of a notification system that is associated with adapting notifications according to monitoring states for an operator of a vehicle.

With reference now to FIG. 2, one embodiment of the notification system 170 of FIG. 1 is further illustrated. The notification system 170 is shown as including a processor(s) 110 from the vehicle 100 of FIG. 1. Accordingly, the processor(s) 110 may be a part of the notification system 170, the notification system 170 may include a separate processor from the processor(s) 110 of the vehicle 100, or the notification system 170 may access the processor(s) 110 through a data bus or another communication path. In one embodiment, the notification system 170 includes a memory 210 that stores a notification module 220. The memory 210 is a random-access memory (RAM), read-only memory (ROM), a hard-disk drive, a flash memory, or other suitable memory for storing the module 220. The module 220 is, for example, computer-readable instructions that when executed by the processor(s) 110 cause the processor(s) 110 to perform the various functions disclosed herein.

With reference to FIG. 2, the notification module 220 generally includes instructions that function to control the processor(s) 110 to receive data inputs from one or more sensors of the vehicle 100. The inputs are, in one embodiment, observations of one or more objects in an environment proximate to the vehicle 100 and/or other aspects about the surroundings. As provided herein, the notification module 220, in one embodiment, acquires sensor data 240 that includes at least camera images. In further arrangements, the notification module 220 acquires the sensor data 240 from further sensors such as a radar 123, light detection and ranging (LIDAR) 124, and other sensors as may be suitable for identifying vehicles and locations of the vehicles.

Accordingly, the notification module 220, in one embodiment, controls the respective sensors to provide the data inputs in the form of the sensor data 240 in the data store 230. Additionally, while the notification module 220 is discussed as controlling the various sensors to provide the sensor data 240, in one or more embodiments, the notification module 220 can employ other techniques to acquire the sensor data 240 that are either active or passive. For example, the notification module 220 may passively sniff the sensor data 240 from a stream of electronic information provided by the various sensors to further components within the vehicle 100. Moreover, the notification module 220 can undertake various approaches to fuse data from multiple sensors when providing the sensor data 240 and/or from sensor data acquired over a wireless communication link.

Moreover, in one embodiment, the notification system 170 includes a data store 230. In one embodiment, the data store 230 is a database. The database is, in one embodiment, an electronic data structure stored in the memory 210 or another data store and that is configured with routines that can be executed by the processor(s) 110 for analyzing stored data, providing stored data, organizing stored data, and so on. Thus, in one embodiment, the data store 230 stores data used by the module 220 in executing various functions. In one embodiment, the data store 230 includes the sensor data 240 along with, for example, metadata that characterize various aspects of the sensor data 240. In various implementations, the sensor data 240 may include glance, gaze, eye-motion, eye position, head position, and so on information associated with the vehicle operator. In one approach, the notification system 170 may determine glance, gaze, eye-motion, and so on of a vehicle operator using geometric and depth estimations of images from a camera. In one approach, the image data may also be fused with touch information on a dial, component, knob, and so on to improve the accuracy of monitoring a key component as explained below.

Furthermore, the data store 230 may include the monitoring data 250. In one approach, the monitoring data 250 may include an operator state such as time looking away from a mirror, frequency of monitoring a mirror, time observing the instrument panel, time observing the front windshield, attention to a heads-up display (HUD), and so on. In various implementations, the notification system 170 may determine the monitoring data 250 using the sensor data 240.

In one embodiment, the notification module 220 is further configured to perform additional tasks beyond controlling the respective sensors to acquire and provide the sensor data 240. For example, the notification module 220 includes instructions that cause the processor(s) 110 to determine an operator state, a vehicle condition, a driving state, an environmental state, and so on of the vehicle 100 from the sensor data 240. An operator state may include time looking away from a mirror, frequency of monitoring a mirror, time observing the instrument panel, time observing the front windshield, attention to a HUD, and so on. In addition, a vehicle condition, a driving state, or an environmental state associated with the vehicle 100 may include information related to speed, wheel angle, a turning scenario, a driving maneuver, merging lanes, traffic, location, weather, lighting levels, and so on. The notification system 170, in various implementations, may determine such information from the sensor data 240 and information from vehicle-to-vehicle (V2V), vehicle-to-everything (V2X), and so on communication.

Moreover, the notification system 170 or notification module 220 may compute differences of the operator state to a parameter associated with monitoring a component in the vehicle 100 or driving scenarios as further explained below. For example, the parameter may represent a minimum number of times the operator monitors a side-view mirror during a lane change on a highway. In one approach, the parameter may be custom to the operator or set according to safety standards, manufacturer criteria, OEM guidelines, government standards, and so on. Moreover, the parameter may also be associated with the environmental state to account for different driving scenarios, in particular during automated driving. In addition, the notification system 170 may adapt a notification of a component for the operator after computing the differences. A component may be a side-view mirror, a rear-view mirror, a control dial, displayed speed, a portion of the HUD, a portion of a windshield, and so on. Regarding automated mode, the parameter may be substantially different than manual mode for a similar lane change, turn, wheel angle, and so on of the vehicle 100. Accordingly, the notification system 170 may adapt a notification of a component for the operator by accounting for automated driving when calculating the differences to improve operator training or guidance.

Figure 3A:
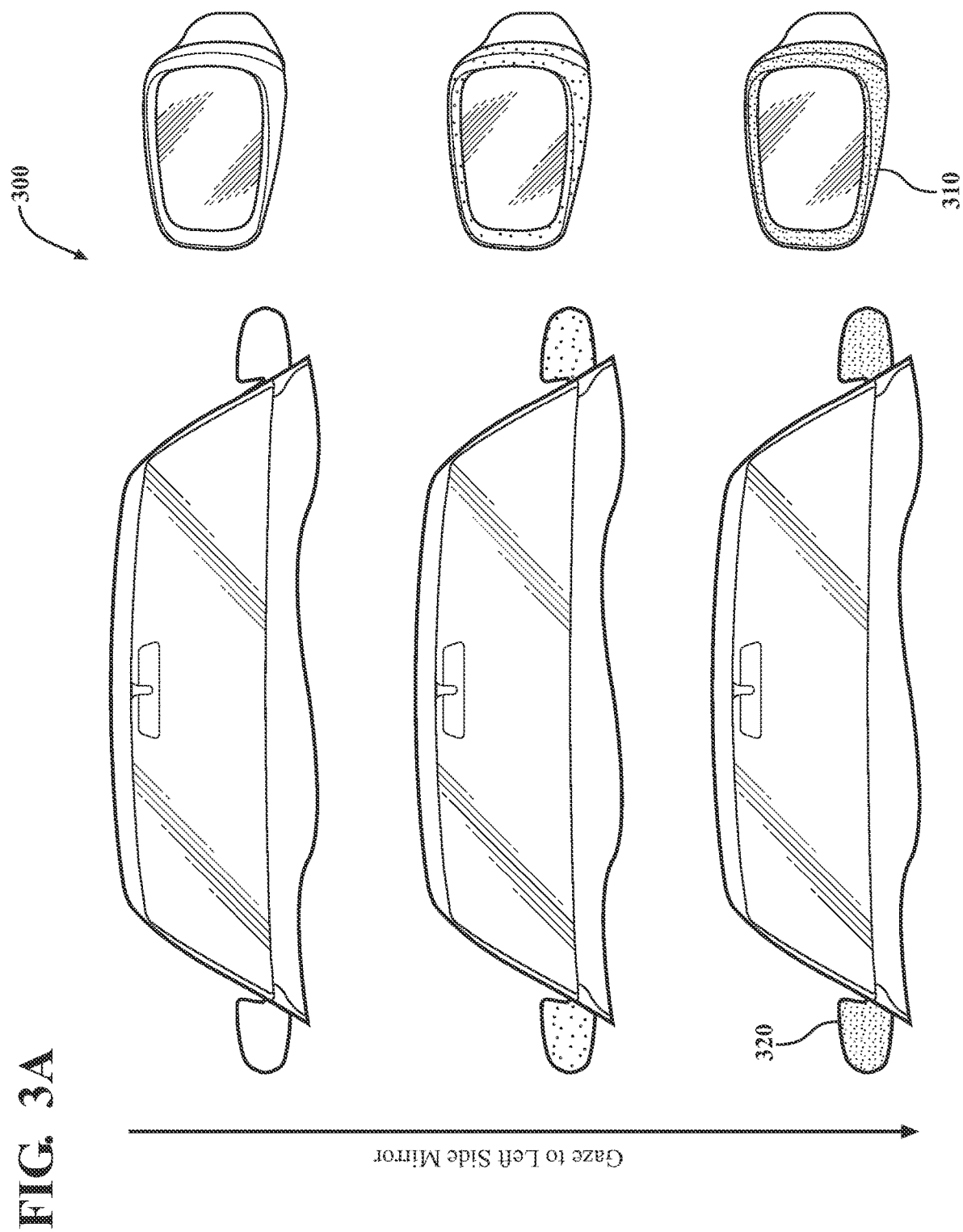
FIGS. 3A and 3B illustrate embodiments of indicators associated with the notification system of FIG. 2.
Figure 3B:
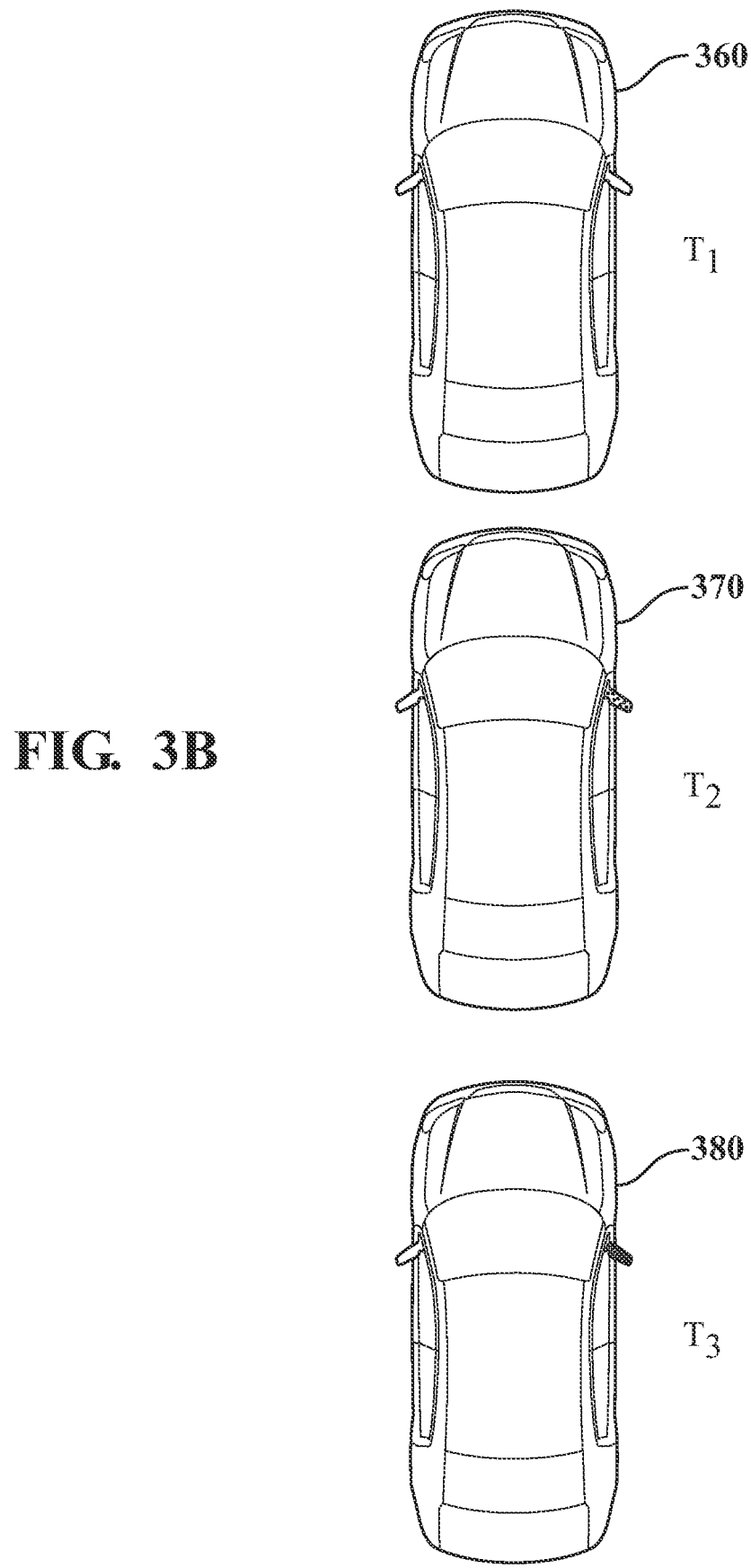

FIGS. 3A and 3B illustrate embodiments of indicators associated with the notification system 170 of FIG. 2. In this example, the notification system 170 may attempt to bring appropriate awareness to a left side-view mirror according to a driving state. Awareness may be desirable since the operator is over-monitoring other mirrors, occupied with non-driving tasks, using the automated mode, and so on the vehicle 100. In system 300, a left side-view mirror may include a light 310 for illumination. The light 310 may be a light system, a LED, a LED string around the side-view mirror, embedded LEDs, a backlight, and so on. Furthermore, although a left side-view mirror is illustrated, the system 300 may operate similarly with the notification system 170 for a rear-view mirror, a right side-view mirror, a digital mirror in a HUD, a control on the vehicle 100, a display on the vehicle 100, and so on. In one approach, the light 310 may be color-coded by off, green, orange, red, and so on urgency levels that bring operator awareness and attention to the mirror. As described further below, the notification system 170 and a controller, such as actuators 150, may use color-codes according to the sensor data 240 and the monitoring data 250 to adaptively guide an operator. Furthermore, the color-codes may reflect a summary or moving average associated with an operator state to normalize errors from gaze estimates or measurements.

Regarding notifications, the system 300 may utilize the visual indicators 320 on a HUD, instrument panel, console display, display, and so on of the vehicle 100 to bring awareness or remind the operator about monitoring a key component(s) associated with a driving state. In addition, FIG. 3B illustrates icons or images 360-380 that may be used as notifications, such as on a cluster display or electronic instrument cluster, for the right side-view mirror. The icons or images 360-380 may be color-coded, similar to the visual indicators 320, and change from times $T_1$ to $T_3$ according to differences between the sensor data 240 and a parameter for monitoring. In one approach, the operation for the difference calculation may involve comparing frequencies or ratios for observations of a component specific to driving states. For example, the parameter may be set according to a safety standard, manufacturer criteria, OEM guidelines, government standards, and so on. As such, the notification system 170 may use the differences between monitoring or surveillance by the operator of a component on the vehicle 100 to adjust or adapt a notification proximate or part of the component.

In one example, the notification system 170 at time $T_2$ may change a cluster display by showing the icon or image 370 since the operator is insufficiently monitoring the right side-view mirror during a lane change to the right. Insufficiency may be based on a frequency of glances, a focus time, an amount of left or right movement (e.g. angle), lateral head geometries, and so on determined from the sensor data 240. Furthermore, the notification system 170 may directly measure the seconds between glances, the number of glances, or a ratio of glances to recommended glances according to the sensor data 240 for a particular driving state. Correspondingly, the notification system 170 may increase the alert or notification by displaying the icon or image 380 at time $T_3$ if the operator continues to insufficiently monitor or neglect the right side-view mirror. In one approach, the transition from $T_2$ to $T_3$ may be shorter than $T_1$ to $T_2$ depending on the speed of the vehicle or the critical nature of the driving state. In this way, the notification system 170 may train or teach an operator through intelligent notifications for a component, thereby improving driver proficiency and safety for the driving state.

Furthermore, the notification system 170 notification adaptations may be utilized with assistance alarms of dangerous conditions during driving of the vehicle 100. Unlike assistance alarms, the notification system 170 may bring awareness or train an operator to properly use a component during the driving state. In some regards, this operation may reduce the need for alarms during partial automated mode, thereby improving operator enjoyment.

In various examples, the notification system 170 may also adapt illumination of an indicator on the dashboard, infotainment display, cluster display, HUD, and so on of the vehicle 100 if an operator should monitor certain regions or portions of the road imminently. A controller, such as actuators 150, may adjust a light, display, or motor to notify the operator about the adaptation. The illumination may cause the operator to look at regions outside of the vehicle 100 more frequently. In addition, the notification system may use auditory or vibrating notifications on or near the component to draw attention substantially with or independent of the illumination. Timing, intensity, brightness, glow, and so on of the illumination may be associated with eye position, gaze position, glance position, head position, and so on of the operator.

Moreover, the notification system 170 may compute a difference of the operator state to a parameter associated with monitoring a component in the vehicle 100. For example, the parameter may recommend that at 60 miles per hour (MPH) an operator can look away from the left region of the road at most for 10 seconds and the front region at most for 5 seconds at night during the manual mode. In various implementations, the parameter may also factor the number of vehicles, location of the vehicle 100, pedestrians, etc. for the recommended observation, monitoring, or surveillance by the operator. During automated or partially automated mode, the notification system 170 may change monitoring or surveying amounts of the left and front regions for the same driving state every 60 and 90 seconds.

In various implementations, the notification system 170 may also accumulate metrics or values associated with the operator state and maintain a notification level if a determined frequency for monitoring a component (e.g. mirror, windshield, etc.) is inadequate for the driving state. In addition to accumulation, the notification system 170 may compute a moving average with an adaptive window size that represents a cost function that quantifies an operator state. The adaptive window size may adjust according to a driving state or the parameter related to monitoring a component. Accordingly, the notification system 170 may adapt a notification of the component according to the difference.

Regarding notification level changes, the notification system 170 may gracefully transition icons or images 360-380 to prevent startling or avoidance by an operator. Once monitoring of a component by an operator satisfies the parameter, criteria, or threshold for monitoring during a particular driving state, the notification may turn off the illumination, sound, vibration, and so on related to the notification. Thus, in various implementations, notification levels may rise gracefully and end abruptly.

Figure 4:
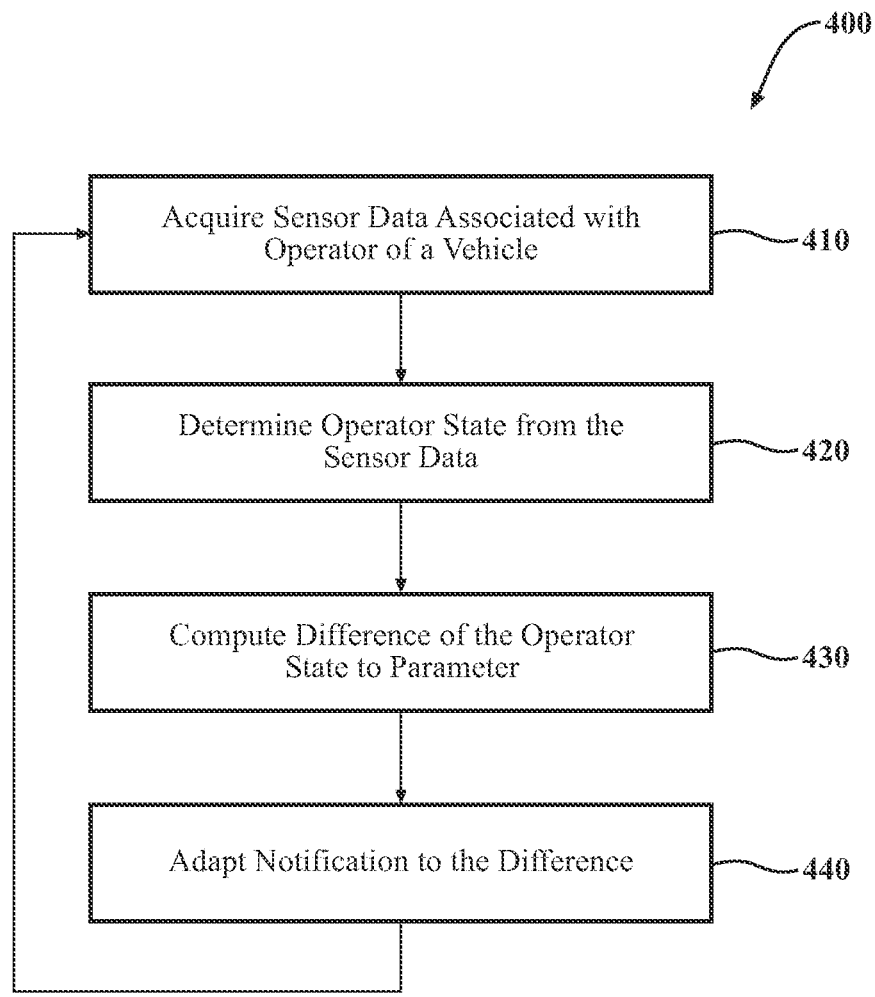
FIG. 4 illustrates one embodiment of a method that is associated with adapting notifications according to monitoring states for an operator of a vehicle.

Turning now to FIG. 4, a method 400 illustrates one embodiment that is associated with adapting notifications according to monitoring states associated with a vehicle operator. FIG. 4 illustrates a flowchart of a method 400 that is associated with adapting notifications according to monitoring states associated with an operator of the vehicle 100. Method 400 will be discussed from the perspective of the notification system 170 of FIGS. 1, and 2. While method 400 is discussed in combination with the notification system 170, it should be appreciated that the method 400 is not limited to being implemented within the notification system 170 but is instead one example of a system that may implement the method 400.

At 410, the notification system 170 controls the sensor system 120 to acquire the sensor data 240 associated with an operator of the vehicle 100. In one approach, the notification system 170 may acquire the sensor data 240 with a frequency $f_1$. In various implementations, the sensor data 240 may include glance, gaze, eye-position, eye motion, head position, and so on information of the operator. The notification system 170 may determine actual glance, gaze, eye motion, a frequency of glances, a focus time, an amount of left or right movement, head angle, lateral geometries, and so on of an operator using geometric and depth estimations of images from a camera. In addition, the image data may also be fused with touch information on a dial, component, knob, and so on to improve the accuracy of monitoring estimation.

At 420, the notification system 170 uses the sensor data 240 to determine an operator state. An operator state may include time looking away from a mirror, frequency of monitoring a mirror, time observing the instrument panel, time observing the front windshield, attention to a HUD, and so on. In one approach, the notification system 170 may determine the operator state by frequency $f_2$ until reliable confirmation of an operator state. Frequency $f_1$ may be less than, greater than, or equal to $f_2$.

In various implementations, the notification system 170 may also use the sensor data 240 to determine a vehicle condition, a driving state, an environmental state, and so on of the vehicle 100 from the sensor data 240. A vehicle condition, a driving state, or an environmental state of the vehicle 100 may include information related to speed, wheel angle, a turning scenario, driving maneuver, merging lanes, traffic, location, weather, lighting levels, and so on. In various implementations, the notification system 170 may determine such information from the sensor data 240 and information from V2V, V2X, and so on communication.

At 430, the notification system 170 computes a difference of the operator state to a parameter associated with monitoring a component in the vehicle 100. For example, the parameter may represent a minimum number of times the operator monitors a mirror during a lane change on a highway. In one approach, the parameter may be custom to the operator or set safety standards, manufacturer criteria, OEM guidelines, government standards, and so on. As described above, the parameter may also be associated with the vehicle condition, the driving state, or the environmental state to account for different driving scenarios, in particular during automated driving. In various implementations, a component may be a side-view mirror, a rear-view mirror, a control dial, displayed speed, a portion of the HUD, a portion of a windshield, and so on. Furthermore, the operation for the difference calculation may involve comparing frequencies or ratios for observations of a component specific to a driving state.

At 440, the notification system 170 adapts a notification associated with the component according to the difference. As described above, adapting may involve illumination of the component or an indicator on the dashboard, infotainment display, cluster display, HUD, and so on of the vehicle 100 so that the operator adjusts monitoring frequency or time according to the driving state. Furthermore, a controller, such as actuators 150, may cause a light, display, or motor to notify the operator about the adaptation. In addition, the method 400 may loop back to 410 at frequency $f_3$ to continuously train or guide the operator.

As further explained above, the notification system 170 may accumulate metrics or values associated with the operator state and maintain a notification level if a determined frequency for monitoring a component (e.g. mirror, windshield, etc.) is inadequate for the driving state. In addition to accumulation, the notification system 170 may compute a moving average with an adaptive window size that represents a cost function that quantifies an operator state. The adaptive window size may adjust according to a driving state or the parameter related to monitoring a component. Accordingly, the notification system 170 may adapt a notification of the component according to the difference.

Still referring to 440, the notification may be a light that is color-coded by off, green, orange, red, and so on urgency levels for bringing operator awareness and attention to the mirror. As such, the notification system 170 may use these color-codes according to the sensor data 240 and the monitoring data 250 to adaptively guide and train an operator. In addition, the color-codes may reflect a summary or moving average associated with an operator state to normalize errors in gaze estimation or measurements.

FIG. 1 will now be discussed in full detail as an example environment within which the system and methods disclosed herein may operate. In some instances, the vehicle 100 is configured to switch selectively between different modes of operation/control according to the direction of one or more modules/systems of the vehicle 100. In one approach, the modes include: 0, no automation; 1, driver assistance; 2, partial automation; 3, conditional automation; 4, high automation; and 5, full automation. In one or more arrangements, the vehicle 100 can be configured to operate in a subset of possible modes.

In one or more embodiments, the vehicle 100 is an automated or autonomous vehicle. As used herein, "autonomous vehicle" refers to a vehicle that is capable of operating in an autonomous mode (e.g., category 5, full automation). "Automated mode" or "autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU), an application-specific integrated circuit (ASIC), a microprocessor, etc. The vehicle 100 can include one or more data stores 115 for storing one or more types of data. The data store(s) 115 can include volatile and/or non-volatile memory. Examples of suitable data stores 115 include RAM, flash memory, ROM, Programmable Read-Only Memory (PROM), Erasable Programmable Read-Only Memory (EPROM), Electrically Erasable Programmable Read-Only Memory (EEPROM), registers, magnetic disks, optical disks, and hard drives. The data store(s) 115 can be a component of the processor(s) 110, or the data store(s) 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry.

In one or more arrangements, the map data 116 can include one or more terrain maps 117. The terrain map(s) 117 can include information about the terrain, roads, surfaces, and/or other features of one or more geographic areas. The terrain map(s) 117 can include elevation data in the one or more geographic areas. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles can include trees, buildings, curbs, fences, railings, medians, utility poles, statues, monuments, signs, benches, furniture, mailboxes, large rocks, or hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

One or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information about one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means a device that can detect, and/or sense something. In at least one embodiment, the one or more sensors detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors may function independently or two or more of the sensors may function in combination. The sensor system 120 and/or the one or more sensors can be operatively connected to the processor(s) 110, the data store(s) 115, and/or another element of the vehicle 100. The sensor system 120 can produce observations about a portion of the environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect information about the vehicle 100 itself. In one or more arrangements, the vehicle sensor(s) 121 can be configured to detect position and orientation changes of the vehicle 100, such as, for example, based on inertial acceleration. In one or more arrangements, the vehicle sensor(s) 121 can include one or more accelerometers, one or more gyroscopes, an inertial measurement unit (WILT), a dead-reckoning system, a global navigation satellite system (GNSS), a global positioning system (GPS), a navigation system 147, and/or other suitable sensors. The vehicle sensor(s) 121 can be configured to detect one or more characteristics of the vehicle 100 and/or a manner in which the vehicle 100 is operating. In one or more arrangements, the vehicle sensor(s) 121 can include a speedometer to determine a current speed of the vehicle 100.

Alternatively, or in addition, the sensor system 120 can include one or more environment sensors 122 configured to acquire data about an environment surrounding the vehicle 100 in which the vehicle 100 is operating. "Surrounding environment data" includes data about the external environment in which the vehicle is located or one or more portions thereof. For example, the one or more environment sensors 122 can be configured to sense obstacles in at least a portion of the external environment of the vehicle 100 and/or data about such obstacles. Such obstacles may be stationary objects and/or dynamic objects. The one or more environment sensors 122 can be configured to detect other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more of: radar sensors 123, LIDAR sensors 124, sonar sensors 125, weather sensors, haptic sensors, locational sensors, and/or one or more cameras 126. In one or more arrangements, the one or more cameras 126 can be high dynamic range (HDR) cameras, stereo, or infrared (IR) cameras.

The vehicle 100 can include an input system 130. An "input system" includes components or arrangement or groups thereof that enable various entities to enter data into a machine. The input system 130 can receive an input from a vehicle occupant. The vehicle 100 can include an output system 135. An "output system" includes one or more components that facilitate presenting data to a vehicle occupant.

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, any of the systems or portions thereof may be otherwise combined or segregated via hardware and/or software within the vehicle 100. The vehicle 100 can include a propulsion system 141, a braking system 142, a steering system 143, a throttle system 144, a transmission system 145, a signaling system 146, and/or a navigation system 147. Any of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system, or a geolocation system.

The processor(s) 110, the notification system 170, and/or the autonomous driving module(s) 160 can be operatively connected to communicate with the various vehicle systems 140 and/or individual components thereof. For example, returning to FIG. 1, the processor(s) 110 and/or the autonomous driving module(s) 160 can be in communication to send and/or receive information from the various vehicle systems 140 to control the movement of the vehicle 100. The processor(s) 110, the notification system 170, and/or the autonomous driving module(s) 160 may control some or all of the vehicle systems 140 and, thus, may be partially or fully autonomous as defined by the society of automotive engineers (SAE) levels 0 to 5.

The processor(s) 110, the notification system 170, and/or the autonomous driving module(s) 160 can be operatively connected to communicate with the various vehicle systems 140 and/or individual components thereof. For example, returning to FIG. 1, the processor(s) 110, the notification system 170, and/or the autonomous driving module(s) 160 can be in communication to send and/or receive information from the various vehicle systems 140 to control the movement of the vehicle 100. The processor(s) 110, the notification system 170, and/or the autonomous driving module(s) 160 may control some or all of the vehicle systems 140.

The processor(s) 110, the notification system 170, and/or the autonomous driving module(s) 160 may be operable to control the navigation and maneuvering of the vehicle 100 by controlling one or more of the vehicle systems 140 and/or components thereof. For instance, when operating in an autonomous mode, the processor(s) 110, the notification system 170, and/or the autonomous driving module(s) 160 can control the direction and/or speed of the vehicle 100. The processor(s) 110, the notification system 170, and/or the autonomous driving module(s) 160 can cause the vehicle 100 to accelerate, decelerate, and/or change direction. As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be an element or a combination of elements operable to alter one or more of the vehicle systems 140 or components thereof responsive to receiving signals or other inputs from the processor(s) 110 and/or the autonomous driving module(s) 160. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor(s) 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processors 110. Alternatively, or in addition, one or more data stores 115 may contain such instructions.

In one or more arrangements, one or more of the modules described herein can include artificial intelligence elements, e.g., neural network, fuzzy logic, or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine position and velocity of the vehicle 100. The autonomous driving module(s) 160 can determine the location of obstacles, obstacles, or other environmental features including traffic signs, trees, shrubs, neighboring vehicles, pedestrians, etc.

The autonomous driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 either independently or in combination with the notification system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source such as determinations from the sensor data 240. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-4, but the embodiments are not limited to the illustrated structure or application.

The flowcharts and block diagrams in the figures illustrate the architecture, functionality, and operation of possible implementations of systems, methods, and computer program products according to various embodiments. In this regard, a block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein.

The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a ROM, an EPROM or Flash memory, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an ASIC, a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, radio frequency (RF), etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all combinations of one or more of the associated listed items. As an example, the phrase "at least one of A, B, and C" includes A, B, C, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A notification system comprising:
a memory communicably coupled to a processor and storing:
a notification module including instructions that when executed by the processor cause the processor to:
acquire sensor data associated with an operator of a vehicle using automated driving for a maneuver;
determine an operator state from the sensor data using a derived body angle and a geometric profile of the operator towards a component and another component associated with the vehicle, the operator state indicating excessive monitoring of the another component for the maneuver and an urgency level;
compute a difference of the operator state to a parameter associated with monitoring the component in the vehicle for the maneuver; and
adapt a notification associated with the component by a controller according to insufficient awareness estimated from the difference, and the notification factors training the operator for using the component during the maneuver.

2. The notification system of claim 1, wherein the notification module includes instructions to determine the operator state further including instructions to monitor a gaze of the operator to the component and the another component according to the sensor data and compute an average of the operator state according to a frequency of the gaze, the body angle, and the geometric profile.

3. The notification system of claim 2, wherein the notification module includes instructions to compute the difference further including instructions to compare the average to the parameter in association with adapting the notification, wherein the parameter is different for the maneuver during a manual mode.

4. The notification system of claim 1, wherein the notification module includes instructions to compute the difference further including instructions to compare the insufficient awareness of the operator according to the sensor data to the parameter and wherein instructions to adapt the notification further include instructions to change illumination of the component and an operation of the another component in relation to minimizing the difference.

5. The notification system of claim 1, wherein the notification module further includes instructions to control the component to change illumination in association with the notification.

6. The notification system of claim 1, wherein the notification module further includes instructions to compute a moving average of the operator state that increases or decreases according to a gaze frequency by the operator to the component and an operation of the another component, and to control illumination of the component by the controller according to the moving average changing and the parameter, wherein a window size of the moving average is a cost function for the operator state that factors a complexity associated with the maneuver.

7. The notification system of claim 6, wherein the moving average is proportional to the gaze frequency and a vehicle state.

8. The notification system of claim 1, wherein the parameter is set according to conditions related to the automated driving or illumination of the component for an environmental state of the vehicle.

9. A non-transitory computer-readable medium comprising:
instructions that when executed by a processor cause the processor to:
acquire sensor data associated with an operator of a vehicle using automated driving for a maneuver;
determine an operator state from the sensor data using a derived body angle and a geometric profile of the operator towards a component and another component associated with the vehicle, the operator state indicating excessive monitoring of the another component for the maneuver and an urgency level;

compute a difference of the operator state to a parameter associated with monitoring the component in the vehicle for the maneuver; and adapt a notification associated with the component by a controller according to insufficient awareness estimated from the difference, and the notification factors training the operator for using the component during the maneuver.

10. The non-transitory computer-readable medium of claim 9, wherein the instructions to determine the operator state further include instructions to monitor a gaze of the operator to the component and the another component according to the sensor data and compute an average of the operator state according to a frequency of the gaze, the body angle, and the geometric profile.

11. The non-transitory computer-readable medium of claim 10, wherein the instructions to compute the difference further include instructions to compare the average to the parameter in association with adapting the notification, wherein the parameter is different for the maneuver during a manual mode.

12. The non-transitory computer-readable medium of claim 9, wherein the instructions to compute the difference further include instructions to compare the insufficient awareness of the operator according to the sensor data to the parameter and wherein the instructions to adapt the notification further include instructions to change illumination of the component and an operation of the another component in relation to minimizing the difference.

13. A method, comprising:
acquiring sensor data associated with an operator of a vehicle using automated driving for a maneuver;

determining an operator state from the sensor data using a derived body angle and a geometric profile of the operator towards a component and another component associated with the vehicle, the operator state indicating excessive monitoring of the another component for the maneuver and an urgency level;

computing a difference of the operator state to a parameter associated with monitoring the component in the vehicle for the maneuver; and adapting a notification associated with the component by a controller according to insufficient awareness estimated from the difference, and the notification factors training the operator for using the component during the maneuver.

14. The method of claim 13, wherein determining the operator state further includes monitoring a gaze of the operator to the component and the another component according to the sensor data and computing an average of the operator state according to a frequency of the gaze, the body angle, and the geometric profile.

15. The method of claim 14, wherein computing the difference further includes comparing the average to the parameter in association with adapting the notification wherein the parameter is different for the maneuver during a manual mode.

16. The method of claim 13, wherein computing the difference further includes comparing the insufficient awareness of the operator according to the sensor data to the parameter and wherein adapting the notification further includes changing illumination of the component and an operation of the another component in relation to minimizing the difference.

17. The method of claim 13, further comprising:
controlling the component to change illumination in association with the notification.

18. The method of claim 13, further comprising:
computing a moving average of the operator state that increases or decreases according to a gaze frequency by the operator to the component and an operation of the another component; and controlling illumination of the component by the controller according to the moving average changing and the parameter, wherein a window size of the moving average is a cost function for the operator state that factors a complexity associated with the maneuver.

19. The method of claim 18, wherein the moving average is proportional to the gaze frequency and a vehicle state.

20. The method of claim 13, wherein the parameter is set according to conditions related to the automated driving or illumination of the component for an environmental state of the vehicle.

* * * * *

UNITED STATES PATENT AND TRADEMARK OFFICE
CERTIFICATE OF CORRECTION

PATENT NO. : 11,749,032 B2
APPLICATION NO. : 17/321939
DATED : September 5, 2023
INVENTOR(S) : Hiroshi Yasuda and Manuel Ludwig Kuehner Page 1 of 1

It is certified that error appears in the above-identified patent and that said Letters Patent is hereby corrected as shown below:

In the Specification

Column 11, Line 16: replace "WILT" with --IMU--

Signed and Sealed this
Tenth Day of October, 2023

Katherine Kelly Vidal
*Director of the United States Patent and Trademark Office*